T. STACEY.
BRAKE FOR MINE CARS.
APPLICATION FILED MAR. 1, 1910.

984,045.

Patented Feb. 14, 1911.

2 SHEETS—SHEET 1.

Witnesses

Inventor
Thomas Stacey,
By C. A. Snow & Co.
Attorneys

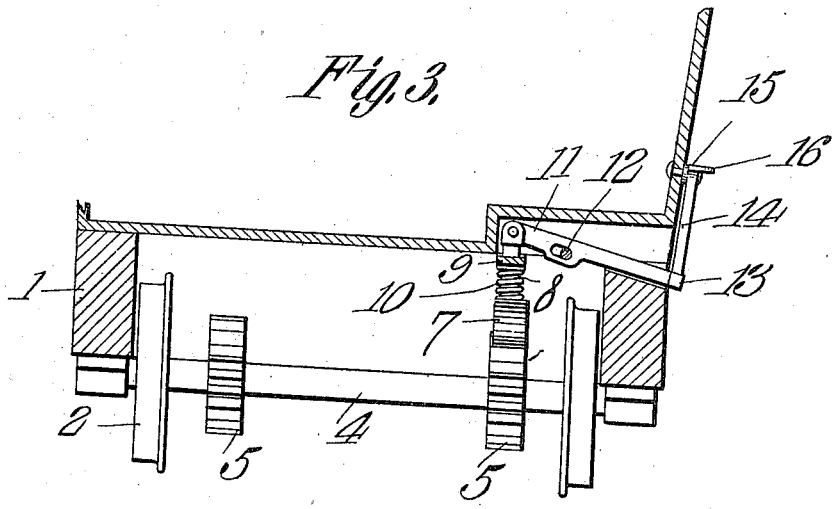
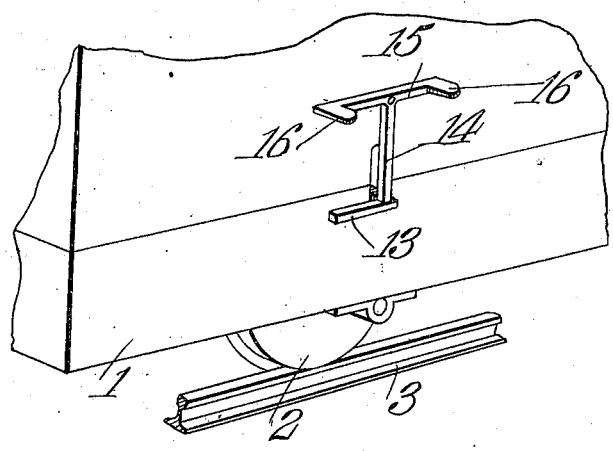

UNITED STATES PATENT OFFICE.

THOMAS STACEY, OF WILKES-BARRE, PENNSYLVANIA.

BRAKE FOR MINE-CARS.

984,045.     Specification of Letters Patent.     Patented Feb. 14, 1911.

Application filed March 1, 1910. Serial No. 546,671.

*To all whom it may concern:*

Be it known that I, THOMAS STACEY, a citizen of the United States, residing at Wilkes-Barre, in the county of Luzerne and State of Pennsylvania, have invented a new and useful Brake for Mine-Cars, of which the following is a specification.

This invention relates to a brake for mine cars, and the object of the invention is to provide means which may be easily operated and will be of simple construction by which the motion of the car may be quickly arrested when so desired without the use of any chocking devices or similar means which are ordinarily employed for that purpose.

The invention consists in certain novel features of the apparatus illustrated in the accompanying drawings, all of which will be hereinafter first fully described and then particularly pointed out in the claim.

Figure 1:
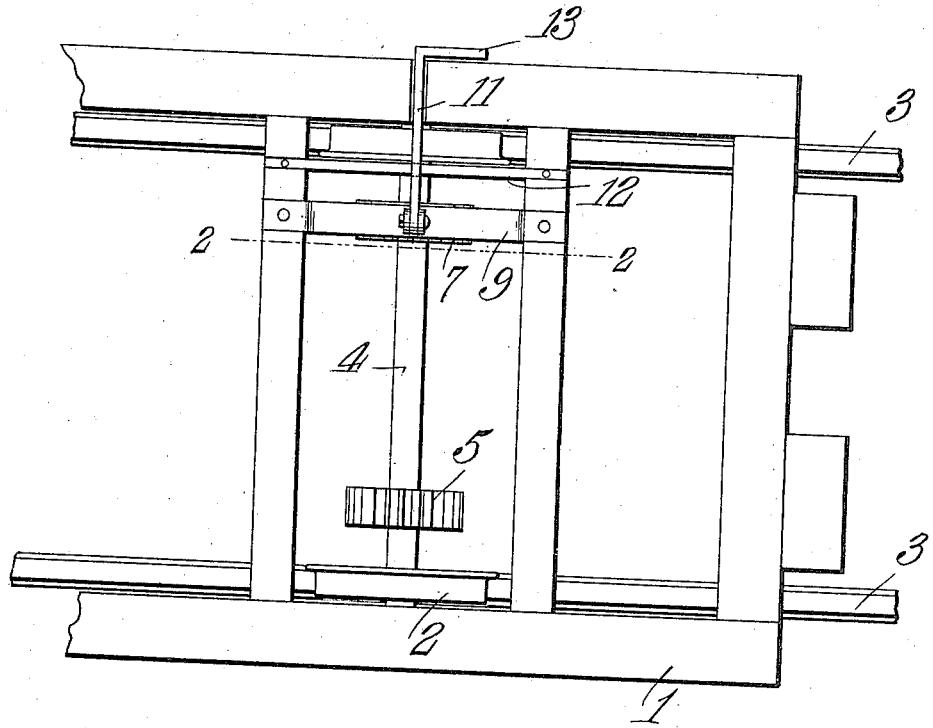
Figure 2:
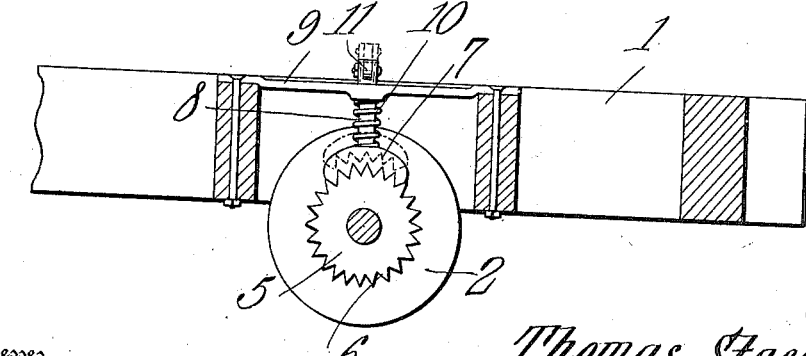

In the drawings, Figure 1 is a plan view of a portion of a mine car showing my improved device in position thereon. Fig. 2 is a vertical section taken on the line 2—2 of Fig. 1. Fig. 3 is a transverse vertical section, and Fig. 4 is a detail perspective view of a device for holding the brake inoperative.

The truck 1 of the car may be of any desired form and is mounted on the usual carrying wheels 2 adapted to move on a track 3, as will be readily understood. Upon the axle 4 of the carrying wheels I secure brake wheels 5 having serrated or toothed peripheries, as shown at 6, and a brake shoe 7 is provided above one of the brake wheels and constructed with similar teeth or serrations in its lower side whereby it may readily engage the brake wheel and quickly stop the travel of the car. The brake shoe is carried by suitable devices mounted on the truck and may be arranged at either side of the car or, if so desired, a brake shoe may be provided at each side of the car. In this manner I provide for operating the brake from either side of the car and if the car is equipped with only one brake shoe that shoe may be mounted upon either side accordingly as the line of the track or the construction of the mine tunnel may render advantageous. The brake shoe is formed at the end of a stem or standard 8 which rises through a supporting bracket or plate 9 secured to transverse beams of the truck, and a spring 10 is arranged around the said stem or standard between the said plate or bar 9 and the brake shoe so as to normally hold the brake shoe in engagement with the brake wheel and consequently hold the car stationary upon the track. To the upper end of the stem or standard 8, I pivot the inner end of an operating lever 11 which is fulcrumed upon a supporting rod 12 secured upon the truck, the outer end of the operating lever extending beyond the side of the truck and being bent to one side to provide a handle portion 13. Pivotally mounted on the car body above the outer projecting end of the operating lever is a latch consisting of a depending arm 14 and a head or operating treadle 15 at the upper end of the said depending arm, the latch being pivoted to the car body at the junction of the head and the depending arm and the said head being provided at each end with a step or projection 16 to facilitate its manipulation.

From the foregoing description it will be seen that I have provided a very simple device by which a mine car may be held stationary upon the track and by which when the car is in motion it may be instantly stopped when so desired. The parts will lie very close to the side of the car, as clearly shown in Fig. 3, and consequently the track may run close to the side of the tunnel without in any way affecting the operation of my improved brake. The device may be arranged on that side of the car which will run closest to the wall of the tunnel so that a miner may work on the wider side of the tunnel floor and not be apt to accidentally release the brake and permit the car to run off. In the normal position of the parts a spring 10 will hold the brake shoe in engagement with the brake wheel. Should it be desired to permit the car to travel, the outer end of the operating lever is depressed either by hand or by foot and the brake shoe is thereby released from the brake wheel against the tension of the spring 10 so that the car may be hauled or permitted to coast to the mouth of the tunnel. In order to hold the brake shoe out of engagement with the brake wheel the latch described and shown is provided and is moved to the position shown in Fig. 4 with the lower end of the depending arm 14 bearing upon the free end of the operating lever so as to hold the said end depressed and the brake shoe in its raised position. When it is desired to stop the car it is necessary only to release the latch which may be done by pressing upon one of the handles or projections 16 either by the hand or foot, as will be readily understood.

Having thus described my invention, what I claim is:

The combination with a mine car truck and carrying wheels therefor, of a brake wheel mounted on the axle of the carrying wheels and provided with a serrated periphery, a bar secured upon the truck, a brake shoe arranged above the brake wheel and provided with a serrated lower face adapted to engage the brake wheel, and a stem projecting upward through the said bar, a spring coiled around the said stem between the said bar and the brake shoe, a fulcrum rod secured upon the truck, and an operating lever pivotally mounted upon the said fulcrum rod and having its inner end pivoted to the upper end of the stem and its outer end projecting laterally beyond the truck.

In testimony that I claim the foregoing as my own, I have hereto affixed my signature in the presence of two witnesses.

THOMAS STACEY.

Witnesses:
M. G. SHIELDS,
WATKIN WILLIAMS.